(12) United States Patent
Graham

(10) Patent No.: US 7,934,254 B2
(45) Date of Patent: Apr. 26, 2011

(54) METHOD AND APPARATUS FOR PROVIDING NETWORK AND COMPUTER SYSTEM SECURITY

(75) Inventor: Robert David Graham, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/535,975

(22) Filed: Sep. 27, 2006

(65) Prior Publication Data

US 2007/0022090 A1 Jan. 25, 2007

Related U.S. Application Data

(63) Continuation of application No. 09/447,500, filed on Nov. 23, 1999, now abandoned.

(51) Int. Cl.
G06F 11/07 (2006.01)
(52) U.S. Cl. ........... 726/22; 726/13; 726/23; 726/24; 726/25; 713/164; 713/193; 709/224; 709/225; 709/229; 709/238
(58) Field of Classification Search .......... 726/22; 713/193
See application file for complete search history.

(56) References Cited

U.S. PATENT DOCUMENTS

| 4,223,380 A | 9/1980 | Antonaccio et al. |
| 4,400,769 A | 8/1983 | Kaneda et al. |
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A * | 9/1994 | Johnson et al. ............ 455/410 |
| 5,347,450 A | 9/1994 | Nugent |

(Continued)

FOREIGN PATENT DOCUMENTS

EP 0 636 977 5/2001

(Continued)

OTHER PUBLICATIONS

Mark Crosbie et al., "Active Defense of a Computer System using Autonomous Agents", Coast Group Dept. of Computer Sciences Purdue, 1995, No. 95-008, pp. 8-11.

(Continued)

*Primary Examiner* — Taghi T Arani
*Assistant Examiner* — Amir Mehrmanesh
(74) *Attorney, Agent, or Firm* — King & Spalding LLP

(57) ABSTRACT

An improved network intrusion detection and response system and method is disclosed for detecting and preventing misuse of network resources. More particularly, the system and method dynamically self-adjusts to changes in network activity using a plurality of alert levels wherein each successively higher alert level triggers a corresponding heightened security response from the networked computer being misused. These heightened alert levels are integrated on both the system (individual node) and the network level. The disclosed intrusion detection and response system is also implemented at low cost using currently-existing hardware and software (i.e., network computers).

35 Claims, 8 Drawing Sheets

U.S. PATENT DOCUMENTS

| | | | |
|---|---|---|---|
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,706,338 A | 1/1998 | Relyea et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,893,091 A * | 4/1999 | Hunt et al. ........................... 1/1 |
| 5,899,999 A | 5/1999 | De Bonet |
| 5,907,602 A | 5/1999 | Peel et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A * | 7/1999 | Sidey ........................... 709/223 |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A * | 11/1999 | Conklin et al. ........................... 726/22 |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 | 10/2001 | Shostack et al. |
| 6,301,668 B1 * | 10/2001 | Gleichauf et al. ........................... 726/25 |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |

| | | |
|---|---|---|
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 * | 9/2002 | Trcka et al. ............... 709/224 |
| 6,453,346 B1 | 9/2002 | Garg et al. |
| 6,460,141 B1 | 10/2002 | Olden |
| 6,463,426 B1 | 10/2002 | Lipson et al. |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 * | 3/2004 | Porras et al. ............... 709/224 |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 * | 4/2004 | Schuba et al. ............... 726/13 |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| JP | 05-327691 | 12/1993 |
| JP | 06-152699 A2 | 5/1994 |
| JP | 09-128336 | 5/1997 |
| JP | 10-210033 | 8/1998 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

John C. Munson et al., "Watcher: The Missing Piece of the Security Puzzle", Computer Security Applications Conferences, 2001. ACSAC 2001. Proceedings $17^{th}$ Annual Dec. 10-14, 2001, pp. 230-239.

Frédéric Cuppens, "Cooperative Intrusion Detection", ONERA Centre de Toulouse (Funded by the DGA/CASSI) pp. 5-9 (No Date), France.

Andrew P. Kosoresow et al., "Intrusion Detection via System Call Traces", Software, IEEE, vol. 14, Issue 5, Sep.-Oct. 1997, pp. 36-38.

Using the CamNet BBS FAQ, http://www.cam.net.uk/manuals/bbsfaq.htm, Jan. 17, 1997, 5 pgs.

NASA Automated Systems Independent Response Capability (NASIRC), Mar. 29, 1994, 7 pgs.

Packages in the net directory, http://linux4u.jnr.ru/usoft/www/www_debian.org/FTP/net.html,Mar. 20, 1997, pp. 1-32.

International Search Report, 3 pp., Apr. 26, 2000.

PCT Written Opinion, International Application No. PCT/US99/28717, International filing date Dec. 3, 1999.

*IDAM: An Intrusion Detection Architecture for Mobile Networks*, Didier Samfat and Refik Molva, Member, IEEE, IEEE Journal on selected areas in communications, vol. 1, No. 7, Sep. 1997 (8 pgs.).

*An Introduction to Intrusion Detection*, by Aurobindo Sundaram, Crossroads, The ACM's First Electronic Publication, Copyright 1996, dated May 31, 2000 (12 pgs.).

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov//secalert/nasa/nasa9401.txt, Mar. 29, 1994.

Packages in the net directory, http://linux4u.jinr.ru/usoft/WWW/www_debian.org/FTP/net.html, Mar. 20, 1997.

Amit Singh, A Taste of Coputer Security, Dealing with Intrusion, Hosted at Jaguar Technology, 1994-2005, downloaded from the Internet Apr. 16, 2005.

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.
International Search Report for PCT/US02/02917 of Aug. 8, 2002.
International Search Report for PCT/US03/00155 of May 15, 2003.
NXI Communications, Inc., White Paper, NTS Security Issues, Oct. 15, 2001, pp. 1-12.
Mounji et al., Distributed Audit Trail Analysis, Proceedings of the Symposium of Network and Distributed System Security, San Diego, CA, Feb. 16-17, 1995, pp. 102-112.
Wobber et al., Authentication in the Taos Operating System, ACM Transactions on Computer Systems, vol. 12, No. 1, Feb. 1994, pp. 3-32.
Mayer et al., The Design of the Trusted Workstation: A True Infosec Product, 13th National Computer Security Conference, Washing, DC, Oct. 1-4, 1990, pp. 827-839.
Dawson, Intrusion Protection for Networks, Byte, Apr. 1995, pp. 171-172.
Buhkan, Checkpoint Charlie, PC Week Network, Nov. 27, 1995, pp. N1, N6-N7.
Process Software Technical Support Page, found on http://www.process.com/techsupport/whitesec.html, printed off of the Process Software website on Feb. 26, 2003, pp. 1-5.
Ganesan, BAfirewall: A Modern Firewall Design, Proceedings Internet Society Symposium on Network and Distributed System Security 1994, Internet Soc., 1994, pp. 99-108.
Lee, Trusted Systems, Chapter II-1-6 of Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primitives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Depaitment of Computer Science, University of Alabama, Jun. 1995, pp. 1-9.
Satyanarayanan, Integrating Security in a Large Distributed System, Acm Transaction on Computer Systems, vol. 7, No. 3, Aug. 1989, pp. 47-280.
Sammons, Nathaniel, "Multi-platform Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10th Annual Computer Security Applications Conference, Dec. 5-9, 1994, Orlando, Florida, pp. 126-132.
Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.
Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.
Benzel et al., "Identification of Subjects and Objects in a Trusted Extensible Client Server Architecture," 18th National Information Systems Security Conference, Oct. 10-13, 1995, Baltimore, Maryland, pp. 83-99.
Epstein et al., "Component Architectures for Trusted Netware," 18th National Information Systems Security Conference, Oct. 10-13, 1995, Baltimore, Maryland, pp. 455-463.
Varadharajan, Vijay, "Design and Management of a Secure Networked Administration System: A Practical Approach," 19th National Information Systems Security Conference, Oct. 22-25, 1996, Baltimore, Maryland, pp. 570-580.
Snapp et al., "DIDS (Distributed Intrusion Detection System)—Motivation, Architecture, and An Early Prototype," 14th National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You A Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration Conference (LISA VI), Oct. 19-23, 1992, Long Beach, California, pp. 175-188.
Vangala et al., "Software Distribution and Management in a Networked Environment," Proceedings of the Sixth Systems Administration Conference, Oct. 19-23, 1992, Long Beach, California, pp. 163-170.
Kim et al., "The Design and Implementation of Tripwire: A File System Integrity Checker," 2nd ACM Conference on Computer and Communications Security, Nov. 2-4, 1994, Fairfax, Virginia, pp. 18-29.
Winn Schwartau, "e.Security™-Solving 'Dumb Days' With Security Visualization," e-Security, Inc., Naples, FL 34103, 2000.
Anita D'Amico, Ph.D., "Assessment of Open e-Security Platform™: Vendor-Independent Central Management of Computer Security Resources," Applied Visions, Inc., 1999.
"e.Security™-Open Enterprise Security Management: Delivering an integrated, automated, centrally Managed Solution You Can Leverage Today and Tomorrow," e-Security, Inc., Naples, FL 34102, 1999.
"e.Security™-Vision," e-Security, Inc., Naples, FL, 1999.
"e.Security™-Administrator Workbench™," e-Security, Inc. Naples, FL, 1999.
"e.Security™-Fact Sheet," e-Security, Inc., Naples, FL, 1999.
"e.Security™-Open e-Security Platform™," e-Security, Inc. Naples, FL, 1999.
Babcock, "E-Security Tackles The Enterprise," Jul. 28, 1999; Inter@ctive Week, www.Zdnet.com.
Kay Blough, "In Search of More-Secure Extranets," Nov. 1, 1999, www.InformationWeek.com.
Paul H. Desmond, "Making Sense of Your Security Tools," Software Magazine and Wiesner Publishing, www.softwaremag.com, 1999.
Kay Blough, "Extra Steps Can Protect Extranets," Nov. 1, 1999, www. InformationWeek.com.
Sean Hao, "Software protects e-commerce—e-Security's product alerts networks when hackers attack," Florida Today, Florida.
Scott Weiss, "Security Strategies™E-Security, Inc.," product brief; Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

"e.Security—"Introducing the First Integrated, Automated, and Centralized Enterprise Security Management System, white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems for Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, 30th Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsof.com/archive/default.asp?url=/archive/en-us/dnarvc/html/msdn_c7pcode2.asp, pp. 1-6, Apr. 1992.

DJGPP COFF Spec, http://delorie.com/digpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.micorsoft.com/supoort/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199...

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.isp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.
Lunt, Teresa, A survey of intrusion detection techniques, 1993, pp. 405-418.
Lunt, Teresa, Automated Audit Trail Analysis and Intrusion Detection: A Survey, Oct. 1988, pp. 1-8.
Porras et al., Penetration State Transition Analysis A Rule-Based Intrusion Detection Approach, 1992, pp. 220-229.
Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection System, 1988.
Snapp, Steven Ray, Signature Analysis and Communication Issues in a Distributed Intrusion Detection System, 1991, pp. 1-40.
Porras et at, EMERALD: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype for Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Piece of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
EMERALD TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery: An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csidsicsids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.bvte.com/art/9805/sec20/art1.htm, May 1998, pp. 1-8.
Cisco Systems, Inc., Newtork RS: Intrusion Detection and Scanning with Active Audit Session 1305, 1998.
Business Security Advisor Magazine, Intrusion Detection Systems:What You Need to Know, http://advisor.com/doc/0527, Sep. 1998, pp. 1-7.
Garvey et al., An Inference Technique for Integrating Knowledge from Disparate Sources, Multisensor Integration and Fusion for Intelligenct Machines and Systems, 1995, pp. 458-464.
Power et al., CSI Intrusion Detection System Resource, Jul. 1998, pp. 1-7.
Cisco Systems, Inc., NetRanger User's Guide Version 2.1.1, 1998.
Internet Security Systems, Real-Time Attack Recognition and Response: A Solution for Tightening Network Security, http://www.iss.net, 1997, pp. 1-13.
Network ICE Corporation, Network ICE Product Documentation, pp. 1-3, http://www.web.archive.org/web/20011005080013/www.networkice.com/support/documentation.html, Jul. 6, 2004.
Network ICE Corporation, Network ICE Documentation, p. 1, http://www.web.archive.org/web/19991109050852/www.networkice.com/support/docs.htm, Jul. 6, 2004.
Network ICE Corporation, Network ICE Press Releases, p. 1, http://www.web.archive.org/web/19990903214428/www.netice.com/company/pressrelease/press.htm, Jul. 7, 2004.
Network ICE Corporation, Network ICE Press Releases, p. 1, http://www.web.archive.org/web/20000304074934/www.netice.com/company/pressrelease/press.htm, Jul. 7, 2004.
Brentano et al., An Architecture for Distributed Intrusion Detection System, Department of Energy Computer Security Group, 14th Annual Conference Proceedings, pp. (17)25-17(45), May 1991.
Staniford-Chen et al., GrIDS-A Graph Based Intrusion Detection System for Large Networks, University of California, Davis, California, 19th National Information Systems Security Conference, 1996, pp. 1-10.
Ricciulli et al., Modeling Correlated Alarms in Network Management Systems, SRI International, Menlo Park, California Proceedings of the Conference on Communication Networks and Distributed System Modeling and Simulation, 1997, pp. 1-8.
Porras et al., Emerald: Event Monitoring Enabling Responses to Anomalous Live Disturbances, SRI International, Menlo Park, California, 20th National Information Systems Security Conference, Oct. 1997, pp. 1-24.
Porras et al., A Mission-Impact Based Approach to INFOSEC Alarm Correlation, SRI International, Menlo Park, California, Oct. 2002, pp. 1-33.
Phrack 55 Download (234 kb, Sep. 9, 1999), http://www.phrack.org/show.php?p=55&a=9, pp. 1-6.
Porras et al., A Mission-Impact-Based Approach to INFOSEC Alarm Correlation, SRI International, Menlo Park, California, Oct. 2002, pp. 1-19.
Bace, An Introduction to Intrusion Detection and Assessment for System and Network Security Management, 1999, pp. 1-38.
Hunteman, Automated Information System—(AIS) Alarm System, University of California, Los Alamos National Laboratory, 20th National Information System Security Conference, Oct. 1997, pp. 1-12.
Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.
Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b...
Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.
Lunt et al., Knowledge-Based Intrusion Detection, SRI International, Menlo Park, California, Conference on AI Systems in Government, Washington, D.C., Mar. 1989, pp. 102-107.
A. Information Assurance BAA 98-34 Cover Sheet, SRI International, Nov. 1, 2000, pp. 2-35.
NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13$^{th}$ National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14$^{th}$ National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, pp. 1.

Temin, Case Study: The IA: AIDE System at Two, 15$^{th}$ Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21$^{st}$ National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No Date, pp. 1-12.

RealSecure ICEcap Manager User Guide Version 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.

Perrochon et al., Event Mining with Event Processing Networks, Date Unknown, Stanford University, pp. 1-4.

Gruschke, Integrated Event Management: Event Correlation Using Dependency Graphs, presented at DSOM 1998, University of Munich, pp. 1-12.

Bass, Intrusion Detection System and Multisensor Data Fusion, Apr. 2000, Communications of the ACM, vol. 43, No. 4, pp. 99-105.

Bass et al., A Glimpse into the Future of ID, Date Unknown, USENIX, pp. 1-10.

LaPadula, State of the Art in Anomaly Detection and Reaction, Jul. 1999, Mitre Corporation, pp. 1-36.

Rationalizing Security Events with Three Dimensions of Correlation, Date Unknown, NetForensics, Tech Brief, pp. 1-6.

Jou et al., Design and Implementation of a Scalable Intrusion Detection System for the Protection of Network Infrastructure, Date Unknown, MCNC, pp. 1-15.

Caldwell, Event Correlation: Security's Holy Grail?, Aug. 1, 2002, GuardedNet, pp. 1-21.

Metcalf et al., Intrusion Detection System Requirements, Sep. 2000, Mitre Corporation, pp. 1-33.

Jou et al., Architecture Design of a Scalable Intrusion Detection System for the Emerging Network Infrastructure, Technical Report CDRL A005, Apr. 1997, MCNC, pp. 1-42.

Security Manager for UNIX Systems Version 3.2.1 User's Guide, Feb. 1998, Internet Security Systems, pp. 1-162.

RealSecure Release 1.2 for UNIX A User Guide and Reference Manual, 1997, Internet Security Systems, Inc., pp. 1-92.

Internet Scanner SAFE SAFEsuite 4.0 User Guide and Reference Manual, 1996, Internet Security Systems, Inc., pp. 1-158.

Internet Scanner 3.3 User Guide and Reference Manual, 1996, Internet Security Systems, Inc., pp. 1-119.

Landwehr et al., Newsletter of the IEEE Computer Society's TC on Security and Privacy Electronics, Electronic CIPHER, Nov. 25, 1997, Issue 25, pp. 1-34.

20$^{th}$ National Information Systems Security Conference, Oct. 6-10, 1997, Baltimore, Maryland, pp. 1-44.

EMERALD Alert Management Interface User's Guide Version 1.2, Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Network ICE Products—ICEcap, Date Unknown, pp. 1-2.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Administration Guide Version 3.0, 2001, Internet Security Systems Corporation, pp. 1-51.

"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.

* cited by examiner

METHOD AND APPARATUS FOR PROVIDING NETWORK AND COMPUTER SYSTEM SECURITY

STATEMENT REGARDING PRIORITY AND RELATED APPLICATIONS

This application is a continuation of and claims priority to application Ser. No. 09/447,500 filed Nov. 23, 1999, now abandoned entitled "Method and Apparatus for Providing Network and Computer System Security." The entire contents of which are hereby incorporated by reference.

BACKGROUND OF THE INVENTION

1. Field of the Invention

This invention relates to data network management. More particularly, the invention relates to an improved system and method for detecting and preventing unauthorized use of data network resources.

2. Description of the Related Art

The rapid increase in the use of data networks by both corporations and private organizations has created a need for improved security and network management techniques. Organizations today store substantial amounts of confidential information on network servers and workstations including trade secrets, marketing strategies, financial documents, and classified technical information. The disclosure of such information to the public would, in most instances, cause severe damage to the organization.

In addition to the danger of confidential information being read out from the network, there is also a danger of unwanted information being written to the network. For example, with a working knowledge of how to evade currently available security systems, computer hackers (i.e., unauthorized users) are capable of crashing network servers and workstations, corrupting valuable data, and uploading computer viruses to the network. As such, organizations are forced to spend millions of dollars each year in an attempt to prevent this type of data network intrusion.

One system for handling a type of network misuse is commonly referred to as a "firewall." Firewalls are generally situated between a local area network (hereinafter "LAN") and all other external networks (e.g., the Internet). The firewall analyzes all incoming and outgoing digital information and makes a decision as to whether the information should be passed through or discarded. The firewall uses one or more algorithms provided by a network administrator to perform this analysis. For example, a network administrator may configure tables which list acceptable source and destination addresses for network traffic. Traffic addressed to an unlisted source or destination will be filtered out and discarded by the firewall.

Firewalls provide insufficient protection against computer hackers for a variety of reasons. One major reason is that firewalls only protect LANs from the outside world whereas the threat posed by computer hackers is not merely external. In fact, the majority of potential computer hackers are internal computer users, most of whom already have access to the LAN. Although an individual user will typically be provided only limited access to LAN resources, the user may fraudulently acquire access to additional resources by misappropriating other users' passwords (or using other known computer hacking techniques).

A second problem associated with firewalls is that they are static in nature, requiring continuous updates by network administrators to work properly. If a computer hacker obtains the information necessary to break through the firewall (i.e., information needed to disguise his data as data originating from a legitimate source) he will acquire access to resources on the LAN. Another significant problem with firewalls is that they exclude data in an overly simplistic fashion: data is either passed through or it is discarded. No additional analysis is performed on incoming or outgoing data to determine whether the originator of the data—who may be disguising himself to the firewall—is attempting to misuse resources on the LAN.

One technique used to augment the limited scope of protection provided by firewalls has been referred to as "misuse detection." Misuse detection is the process of monitoring and reporting unauthorized or inappropriate activity on network computers. For example, Smaha et al., U.S. Pat. No. 5,557, 742 (hereinafter referred to as "Smaha") discloses a process for detecting a misuse condition by applying predetermined "misuse signatures" to identify known misuses of networked computers. An example of a misuse signature is four unsuccessful logins on a network computer followed by a successful login (see Smaha column 12, lines 12-13).

One limitation of this type of system is that it (like a firewall) is static in nature and requires continuous updates. Thus, as new "misuse signatures" are discovered, they must continually be incorporated into the detection system by programmers or network administrators. Requiring the manual incorporation of new "misuse signatures" is inefficient and will allow an experienced computer hacker access to network resources until his particular "misuse signature" has been determined.

An additional problem with prior art misuse detection systems such as Smaha is that once a potential misuse condition has been observed, the network is limited in its ability to respond to the condition. For example, once a potential hacker has unsuccessfully attempted to login to a networked computer four times as described above, the networked computer will simply deny the hacker access to its resources, rather than taking steps to acquire additional information about the hacker and warn other computers on the network about the hacker. Conversely, if three unsuccessful logins are detected rather than four (followed by a successful login) Smaha discloses no mechanism to raise the system to a heightened security level (i.e., an intermediate level) wherein additional information is collected from the potential hacker before providing access to the network computer.

An additional problem with prior art misuse detection systems such as Smaha is that automated systems can only identify activity as being suspicious, but cannot conclusively differentiate among deliberate misuse attempts, accidents (e.g., user enters the wrong password), or normal incidents (e.g., network manager uses pings to monitor network performance). Thus, prior art misuse detection systems record all suspicious events and rely upon the intelligence of the operator to wade through the "false-positives" in order to find salient records.

SUMMARY OF THE INVENTION

An article of manufacture is disclosed including a sequence of instructions stored on a computer-readable media which when executed by a network node cause the network node to perform the acts of: modifying an alert variable based on data transmissions originating from a suspect node; triggering a first response when said alert variable reaches a first predetermined threshold level; and triggering a second response when said alert variable reaches a second predetermined threshold level.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

What is needed is an improved system and method to aid network administrators in detecting and preventing misuse of network resources. More particularly, what is needed is a comprehensive intrusion detection and response system which will dynamically self-adjust to changes in network activity. What is also needed is an intrusion detection and response system which implements a plurality of alert levels wherein each successively higher alert level triggers a corresponding heightened security response from the networked computer being misused. What is also needed is a system which integrates such heightened alert levels on both the system and the network level. What is also needed is an intrusion detection and response system which can be implemented at low cost and using currently-existing hardware and software (i.e., network computers). What is also needed is an intrusion detection and response system which aggressively filters false-positives while still recording the necessary information to identify an attack.

General Network Configuration

Figure 1:
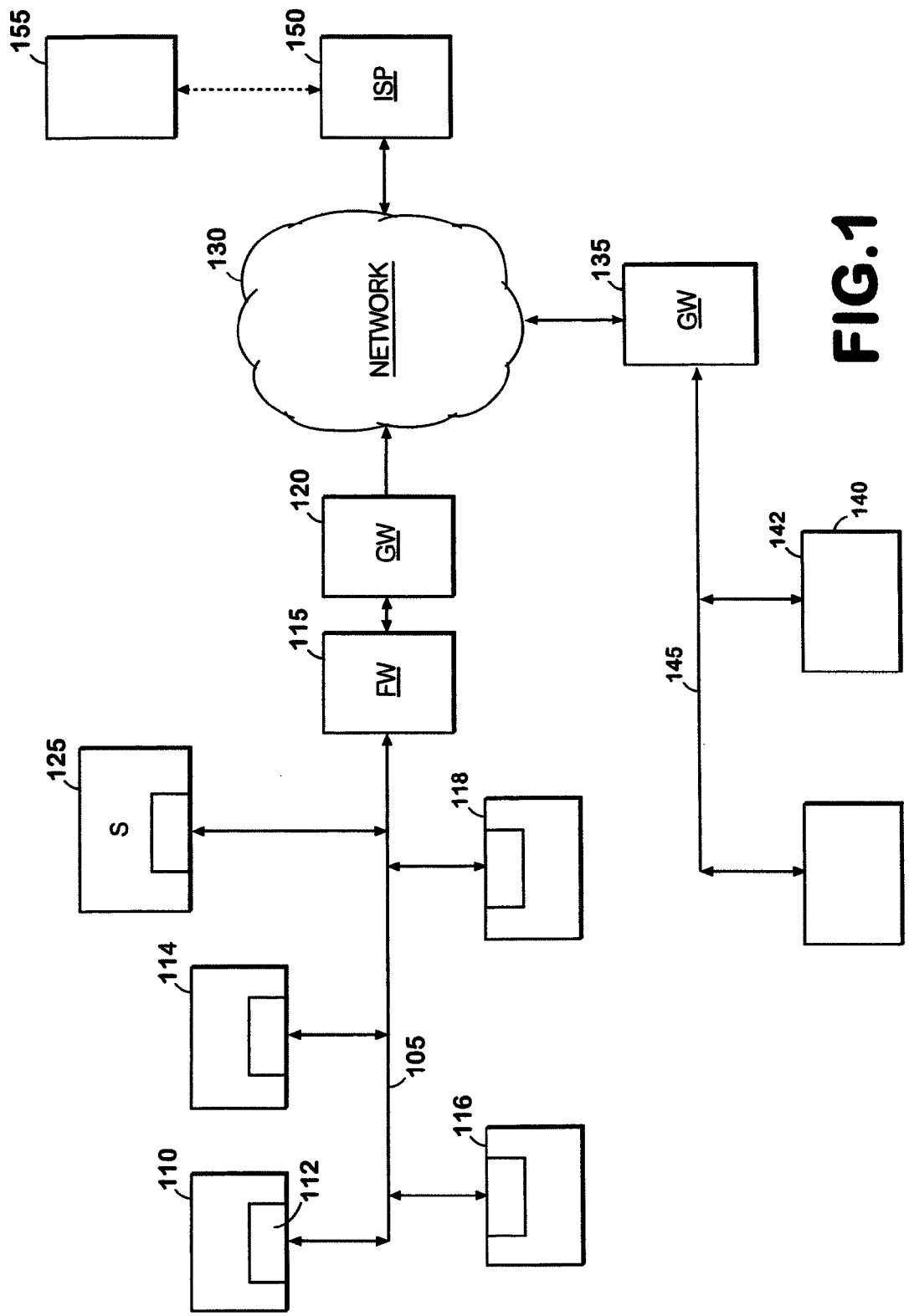
FIG. 1 illustrates generally two local area networks and an Internet Service Provider ("ISP") communicating through a larger network according to one embodiment of the invention.

FIG. 1 generally depicts a local area network (hereinafter "LAN") 105 over which a plurality of nodes (e.g., 110, 125) communicate. Nodes on LAN 105 include a server 125, a plurality of workstations 110, 114, 116, and 118, and a firewall 115. LAN 105 communicates over a larger network 130 (e.g., the Internet) through a gateway 120. The gateway 120 in one embodiment translates between different network protocols of LAN 105 and network 130 as necessary.

A second LAN 145 and a plurality of nodes 140 are illustrated communicating over network 130 through a second gateway 135. An Internet Service Provider 150 (hereinafter "ISP") is shown communicating across network 130. Node 155 may communicates with ISP 150 in a variety of ways including, for example, a standard telephone connection or an ISDN or cable modem connection.

Each workstation 110, 114, 116, and 118 and server 125 on LAN 105 is a computer comprising a processor, such as a CPU, and a computer-readable memory with which software or software modules implementing the functionality of the intrusion detection system described herein is executed. Such a computer system stores and communicates (internally or with other computer systems over a network) code and data using machine readable media, such as magnetic disks, random access memory, read only memory, etc. The processes and functions performed by the workstations 110, 114, 116, and 118 and server 125 described herein can be implemented as program instructions stored on a computer-readable, tangible storage device for execution by the CPU via the computer-readable memory. In addition, while one embodiment is described in which the parts of the present invention are implemented in software, alternative embodiments can implement one or more of these parts using any combination of software, firmware and/or hardware.

Each workstation 110, 114, 116, and 118 and server 125 also includes a network interface 112 comprised of hardware and/or software which allows each of the networked computers 110 114, 116, and 118 and server 125 to transmit data over LAN 105. In one embodiment, the hardware portion of network interface 112 is a network interface card connected to the I/O bus of the networked computer 110.

Aggravation Levels

A. Target Aggravation

As used herein, an "incident" is the receipt of a particular type of data transmission by a network node (e.g., a workstation 110, 114, 116, 118, server 125, firewall 115, gateway 120, ISP 150, etc.) hereinafter referred to as the "target node" or "target," originating from another network node, hereinafter referred to as the "suspect node" or "suspect." Certain types of incidents are inherently suspicious from a system security point of view. For example, the transmission of an invalid user ID or password from a suspect node to a target node may indicate that an unauthorized user is attempting to gain access to the target node. Moreover, a series of login failures over a relatively short period of time creates a substantially greater suspicion of the suspect node than a single login failure. In other words, a single login failure will generally be the result of an authorized user typing his user ID or password incorrectly from the suspect node. However, with each successive invalid login attempt it becomes substantially less likely that the user of the suspect node is simply making a mistake, and more likely that the user is attempting to gain unauthorized access to the target node.

To address these concerns, in one embodiment of the present system a self-modifying alert level is provided for each target node. The alert level, referred to herein as an "aggravation level," changes dynamically in response to incidents arriving at the target node and to the history of incidents which have previously arrived at the target node. The target node may react to new incidents differently depending on its current aggravation level.

Figure 3:
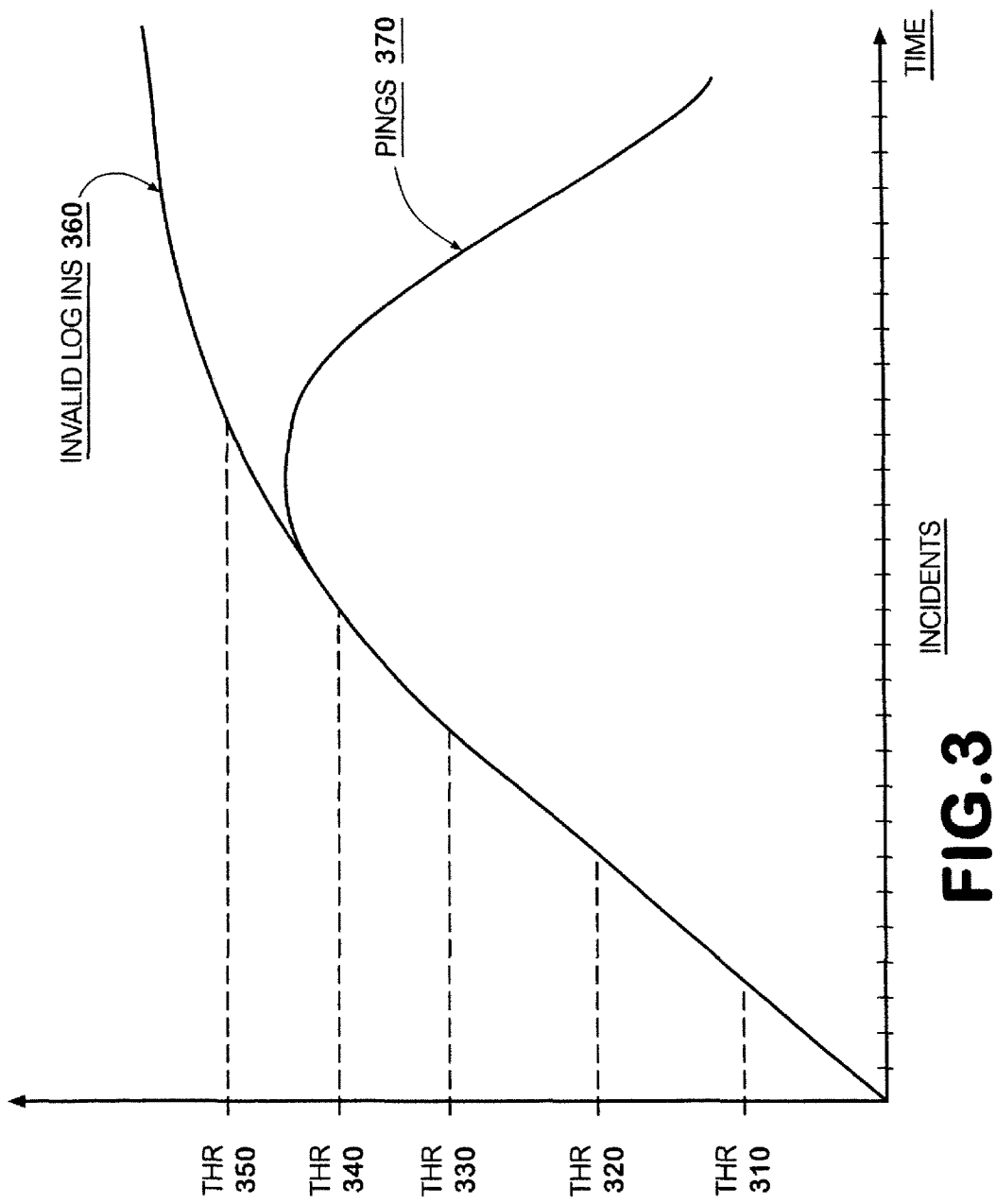
FIG. 3 is a graph illustrating the aggravation response according to one embodiment of the invention.

For example, FIG. 3 is a graph which shows how the aggravation level of a target node in one embodiment of the present system passes through a plurality of threshold levels 310-350. For the purposes of the following discussion, as time increases in FIG. 3 (to the right along the x-axis) it is assumed that the target node receives continual invalid login incidents from one or more suspect nodes. Each threshold is a trigger to take some action. For example, as the aggravation level increases, as shown in curve 360, the first aggravation threshold reached is threshold 310. In one embodiment, at threshold 310 the target node begins a passive scan on all incoming incidents. For example, the target node may begin recording concurrent incoming incidents in an incident log file so that the full extent of the intrusion can be identified. Examples of incidents include web server "hits" (file access), mail commands, port scans, and pings from the suspect(s) to the target.

At the next aggravation threshold, threshold 320, the target node of one embodiment will begin actively scanning the suspect nodes causing the incidents, in an attempt to acquire identification information about the suspect nodes. One example of an active scan is the "finger" command. The finger command returns, among other information, the suspect nodes' network addresses and the identity of the users who are currently logged in to the suspect nodes. At this aggravation threshold, the target may also increase its passive scanning for new incidents. Thus, at aggravation threshold 320, the target may begin to actively acquire information about the suspects and also may increase the logging associated with new incidents.

As the target continues to receive login failures from one or more suspects, its aggravation level reaches threshold 330. Here, the target of one embodiment begins a more aggressive active scan of the suspects. For example, using the "traceroute" command the target may attempt to ascertain the complete network route taken by data originating form the suspect. Thus, referring once again to FIG. 1, if the target node is node 110 on LAN 105 and the suspect node is node 140 on LAN 145, the traceroute command will trace the communication path between the suspect and the target through network 130 (i.e., it will report the network addresses of all the routers in between). In addition, the target may query the suspect's local gateway—gateway 135 in the present example—for the suspect's data link address (a.k.a. media access control address) using the Simple Network Management Protocol ("SNMP"). More specifically, identification via SNMP can consist of a "get-next" sweep of the table of the ifEntry field (usually, one entry per interface).

As the target's aggravation reaches threshold 340, the target in one embodiment will take additional steps to ensure that an unauthorized suspect is not provided with access to its resources. At this threshold level the target may require additional authentication information from suspects before providing the suspects access. For example, when a suspect transmits correct login information (i.e. the correct user ID and password) to the target, the target may initially return an "invalid login" response back to the suspect. Only if the suspect once again transmits the correct login information will the target provide the suspect access. By forcing a double logon in this manner, the target will prevent suspects from acquiring unauthorized access by using automated login scripts, i.e., scripts which run through a series of user ID's and/or passwords in an attempt to determine a valid combination.

At its highest aggravation threshold, threshold 350, the target has received numerous successive login failure incidents, resulting in an unreasonably high probability that an unauthorized suspect is attempting to gain access to its resources. Therefore, at this aggravation level the target may take the final step of blocking incoming incidents (e.g., from every one, from everyone outside its LAN, from a given set of suspects, etc.), thereby denying access to its resources to all of the suspects. The target may also decide to take active scanning measures beyond simple identification, such sending a "ping-of-death" in an attempt to shut down the suspect(s).

Throughout the preceding discussion, specific target node reactions at predetermined aggravation threshold levels have been described. However, alternative embodiments of the invention can use higher, lower and different types of thresholds, threshold reactions, etc., without departing from the underlying principles of the present invention. For example, while the embodiment described above uses the "finger" command at threshold 320 and the "traceroute" command at threshold 330, any alternative/additional active scanning techniques (e.g., "identd" or "ping" commands) could be implemented at these stages without departing from the scope of the present invention. Moreover, different combinations of target node reactions could be employed as well. For example, additional passive scanning techniques could be implemented at each of the threshold levels 310-340 in conjunction with active scanning techniques such as complete packet capture that logs every byte of traffic from the suspect(s).

Moreover, the various threshold levels described above may be calculated using different mathematical equations. For example, the when a new incident arrives at the target node, the aggravation value associated with the incident "$A_I$" may simply be added to the current aggravation of the target "A" such that a threshold will trigger only if $A_I + A > T$. Alternatively, an equation such as $0.5\ A_I + 2A > 0.75T$ would take half of the incident aggravation level added to twice the current target aggravation level and compare the result with three-quarters of the threshold level.

In addition, as shown by curve 370 of FIG. 3, different types of incidents may provoke different target reactions over time. For example, while the target aggravation level may remain above a maximum threshold value 350 during a continuous series of login failures, it may decrease over time during, for example, for a continuous series of "pings." A "ping," short for "Packet Internet Groper," is a command used to determine whether a node at a particular network address is online. Thus, it is frequently used to test and debug a network by sending out a packet and waiting for a response. In one embodiment of the present system, a series of pings directed at a target will initially increase the target's aggravation level because a suspect may ping a target to verify the target's network address before attempting to evade or disable the target's security system.

Accordingly, as shown in curve 370, the target may initially react with the same aggravation as if it were receiving login failures (i.e., curves 360 and 370 initially overlap). However, over time the aggravation level may decrease, even if the target continues to receive pings. This is because as time passes it becomes less and less likely that the suspect pinging the target is attempting to gain unauthorized access to the target. For example, the suspect may be running network management software and may simply be monitoring the response time of the target node by sending out a ping every few minutes. Alternatively, a network administrator may ping various nodes on the network to troubleshoot portions of the network. As such, when a suspect pings a target over an extended period of time, it is more likely that the suspect is pinging the target for legitimate purposes.

Furthermore, while curves 360 and 370 illustrate an example when the aggravation level is changed at the same rate for different incident types, alternative embodiments vary the rate of change based on the type of incident.

B. Network Aggravation

In addition to maintaining an aggravation level for each individual target node on the network, an aggravation level may also be maintained for the entire network (hereinafter referred to as the "network aggravation level"). For example, the system may be configured such that server 125 receives each target's current aggravation level. Particularly, server 125 may be configured to query each of the target nodes 110, 114, 116, and 118 on LAN 105 at predetermined time intervals to record each target's current aggravation level. Alternatively, or in addition, each target may actively communicate its current aggravation level to server 125 (without first receiving a request from server 125) at predetermined time intervals or when the target's aggravation level transitions from one threshold to another.

The network aggravation level may be calculated by simply averaging the individual target aggravation levels. Alternatively, it may bear some other mathematical relationship with the target aggravation levels. For example, it may be configured to respond only to significant short term changes in individual target aggravations (which could indicate that a suspect is initiating an attack on a target).

Regardless of how the network aggravation level is calculated, however, it can be used in a number of different ways. For example, a first network aggravation threshold may force all target nodes on LAN 105 to require double logins (as described above). A second network aggravation threshold may be set to block network traffic. For example, if the network aggravation level reaches a particular threshold, server 125 may direct gateway 120 to disable all incoming traffic. In this embodiment, server 125 may be configured to differentiate between target aggravations resulting from internal suspects (i.e., residing on LAN 105) and external suspects (i.e., residing over network 130). To accomplish this, server 125 may maintain an internal network aggravation level and an external network aggravation level. The server in this embodiment would disable data traffic through gateway 120 only if the external suspect aggravation level reached a particular threshold.

C. Suspect-Specific and Overall Target Aggravation

In another embodiment, each target node (i.e., workstation 110 and/or server 125) on LAN 105 maintains a unique aggravation level for each suspect node with which it communicates (i.e., from which incidents have originated). This aggravation level will be referred to herein as the "suspect-specific aggravation." In addition to maintaining a suspect-specific aggravation for each individual suspect node, the target node may also maintain an overall aggravation level, referred to herein as the "target aggravation" or the "overall target aggravation."

Although a correlation exists between the various suspect-specific aggravation levels and the overall target aggravation level during certain periods of time, this correlation does not always exist. More specifically, the overall target aggravation will react primarily to new incidents, whereas the suspect-specific aggravation will react to both new and old incidents.

Figure 4:
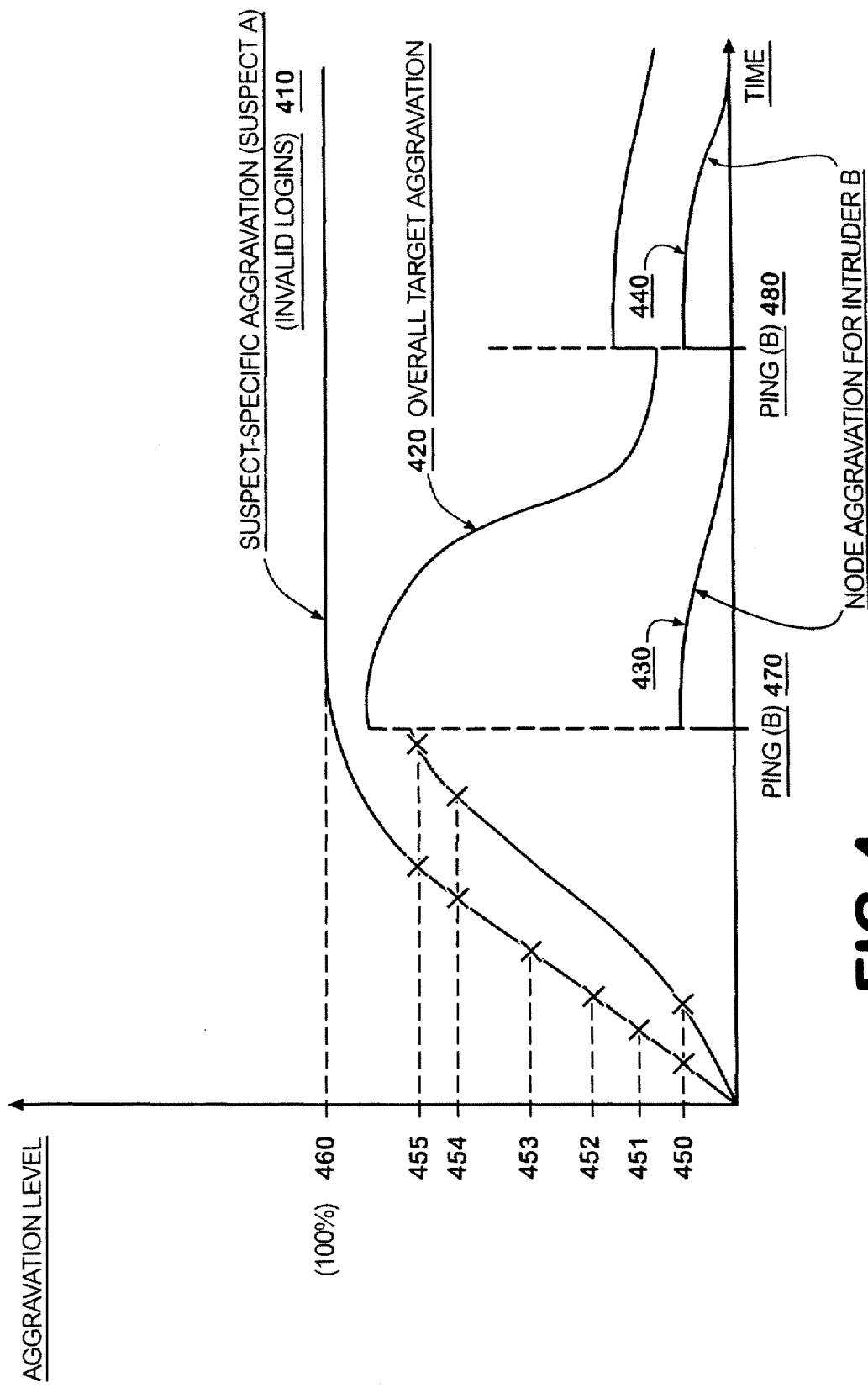
FIG. 4 is a graph illustrating the overall target aggravation response and the suspect-specific target aggravation response according to one embodiment of the invention.

The relationship between the two different aggravations for one embodiment will now be described with reference to FIG. 4. As shown in FIG. 4, if at time t=0 suspect A begins a series of unsuccessful login attempts to the target node, the target's aggravation level towards suspect A (shown as curve 410) will increase with each unsuccessful attempt. The target's suspect-specific aggravation for suspect A will pass through one or more thresholds 450-455 (as described above with reference to FIG. 3) and will level out at some maximum aggravation value 460 representing 100% aggravation. The target's aggravation towards suspect A will remain at this level as long as continuous login failures are received from suspect A. In fact, even if the login failures from suspect A cease, the suspect-specific aggravation in one embodiment will remain at 100% until the target is reset by a network administrator or an automated reset mechanism.

Also illustrated in FIG. 4 is curve 420 representing the overall target aggravation. The overall target aggravation, representing the target's aggravation in general, reacts to incoming incidents from all suspects. Moreover, the overall target aggravation thresholds (e.g., 450, 454, and 455) may cause different reaction types directed towards all suspects (rather than towards a particular suspect as with the suspect-specific thresholds). Thus, as suspect A continually attempts unsuccessfully to log in to the target, the overall target aggravation initially increases along with its suspect-specific aggravation for suspect A. Thus, when the overall target aggravation (curve 420) reaches aggravation threshold 450, the target may conduct a passive scan of all incoming incidents (rather than merely scanning incidents originating from a particular suspect). Likewise, when the overall target aggravation reaches threshold 454 the target may require increased authentication from all suspects and at threshold 455 the target may block communication with all suspects.

Thus, at 470 when a second suspect—suspect B—initially pings the target node, the target node may not respond to the ping because the target's overall aggravation level is higher than threshold 455 (i.e., the target is blocking communication with all suspects). Note that the suspect-specific aggravation level for suspect B 430 is low at this point because this is the first time that suspect B has pinged the target.

Eventually, however, the overall target aggravation level begins to decrease. As stated above, the overall target aggravation is affected more by incidents which have not been observed continually over a long period of time, whereas the suspect-specific aggravation reacts to both long term and short-term incidents. The logic behind this behavior is that when the target is being aggravated by only a single suspect (or a few suspects) over an extended period of time, there is no need for the target to be suspicious of all suspects—only the ones causing its aggravation.

Moreover, because the target's suspect-specific aggravation towards suspect A it beyond threshold 455, the target has taken steps to block communication with suspect A. The target, therefore, no longer needs to maintain a heightened overall target aggravation because the one suspect causing the login failures has been blocked out.

The second time that suspect B pings the target (at 370), the overall target aggravation is low enough so that the target may now respond to the ping. As shown in curves 430 and 440, both of suspect B's pings increase the target's suspect-specific aggravation towards suspect B and the overall target aggravation level 420. The increase in aggravation level may be related to the target aggravation level: incident 470 may be more aggravating than incident 480 because the system is at a more sensitive state.

Figure 2:
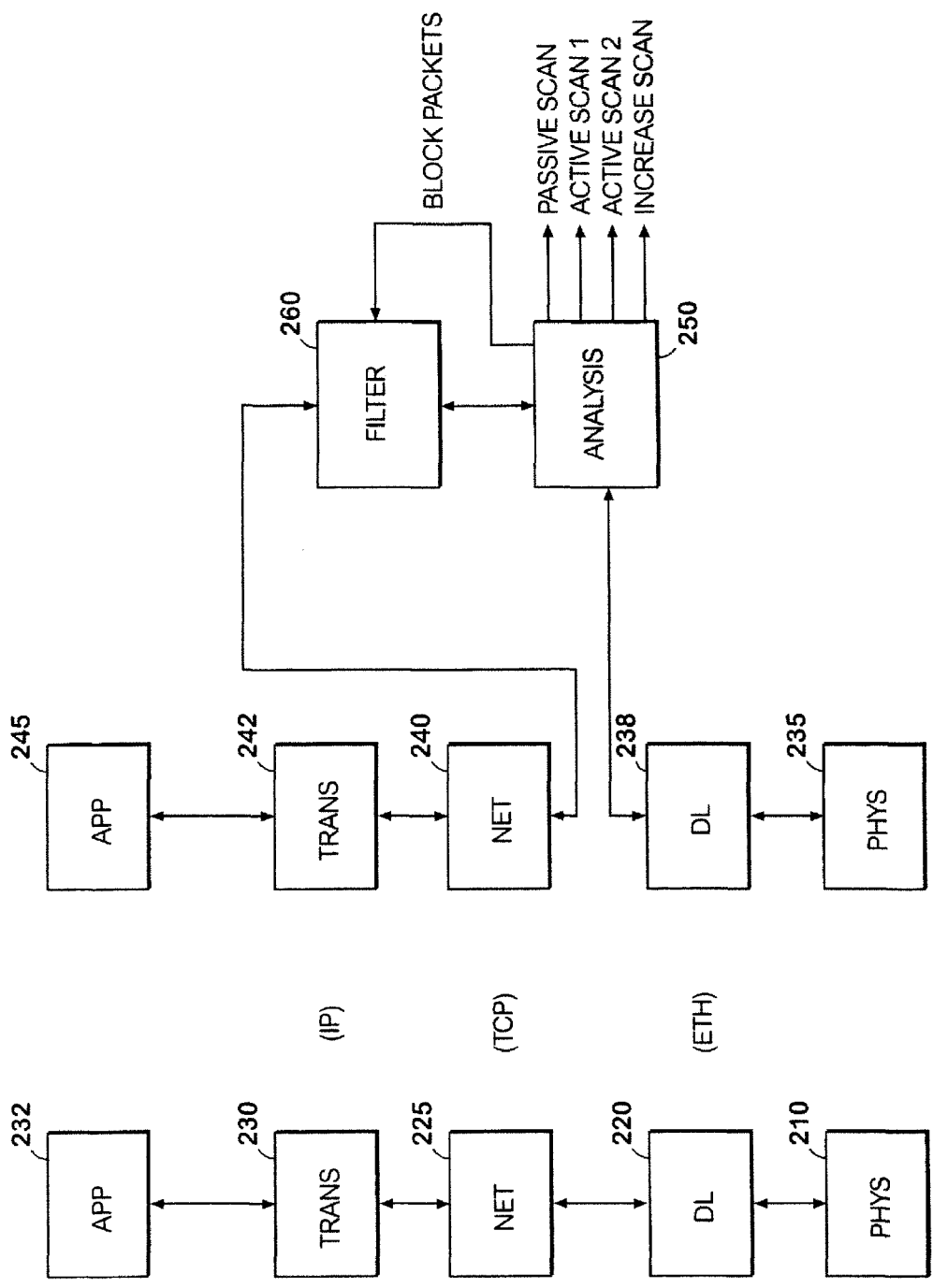
FIG. 2A illustrates portions of the OSI protocol stack according to one embodiment of the invention.
FIG. 2B illustrates an analysis and filter system implemented between the data link and network layers of the OSI stack according to one embodiment of the invention.
Figure 5:
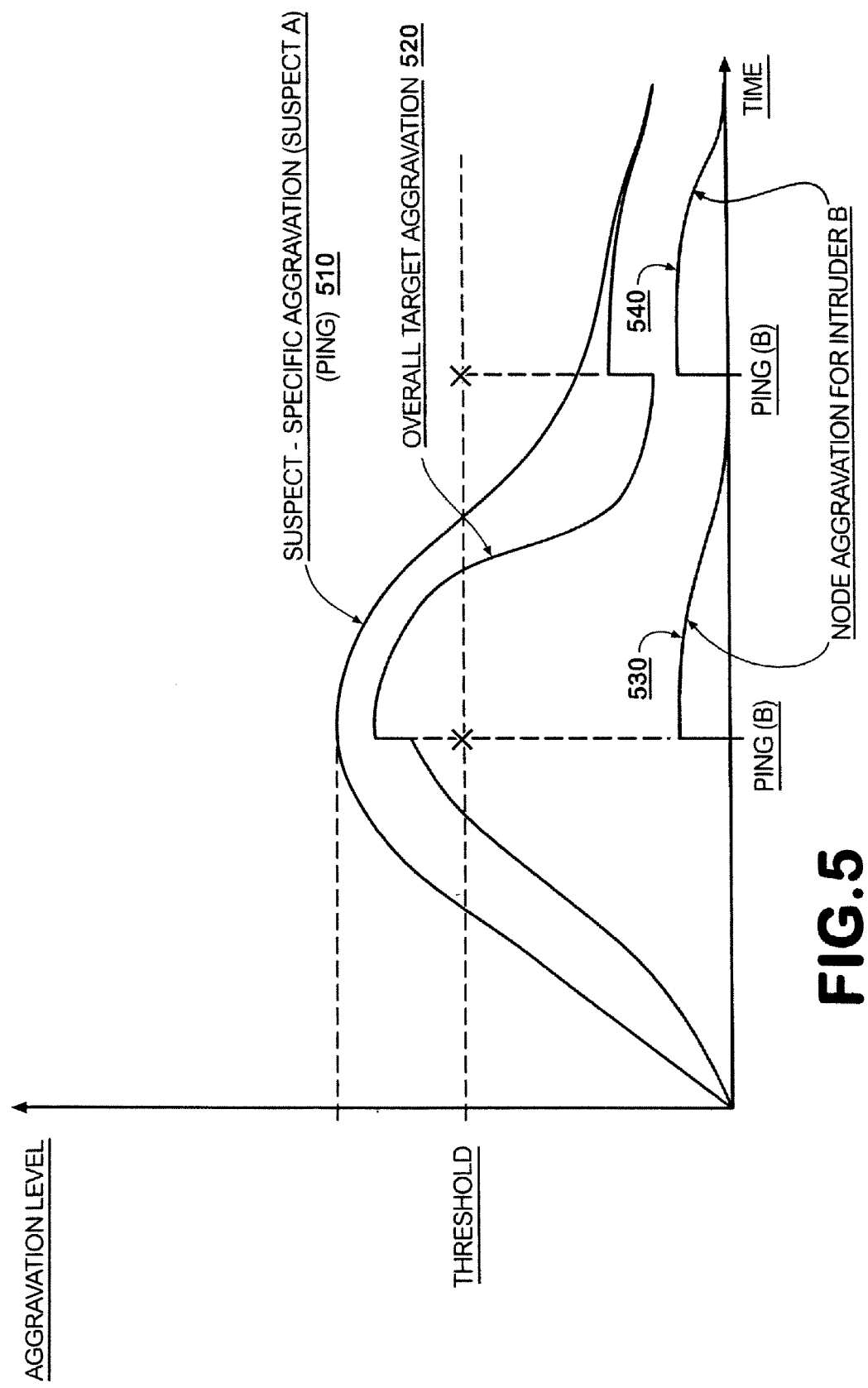
FIG. 5 is a graph illustrating the overall target aggravation response and the suspect-specific target aggravation response according to another embodiment of the invention.

FIG. 5 is a graph illustrating the overall target aggravation response and the suspect-specific target aggravation response according to another embodiment of the invention. The primary difference between FIG. 4 and FIG. 5 is in the behavior of the target's suspect-specific aggravation towards suspect A (illustrated as curve 510). Suspect A in this example is continually pinging the target rather than continually causing login failures. Therefore, due to the different implications of receiving a series of pings from a suspect and a receiving a series of invalid logins from a suspect (described above in more detail with respect to FIG. 2) the target's suspect-specific aggravation towards suspect A eventually decreases over time along with the overall target aggravation.

D. Suspect-Specific and Overall Network Aggravation

Just as each individual target in one embodiment maintains an overall target aggravation level and one or more suspect-specific target aggravation levels, server 125 in one embodiment maintains an "overall network aggravation" level and a separate "suspect-specific network aggravation" level.

Figure 6:
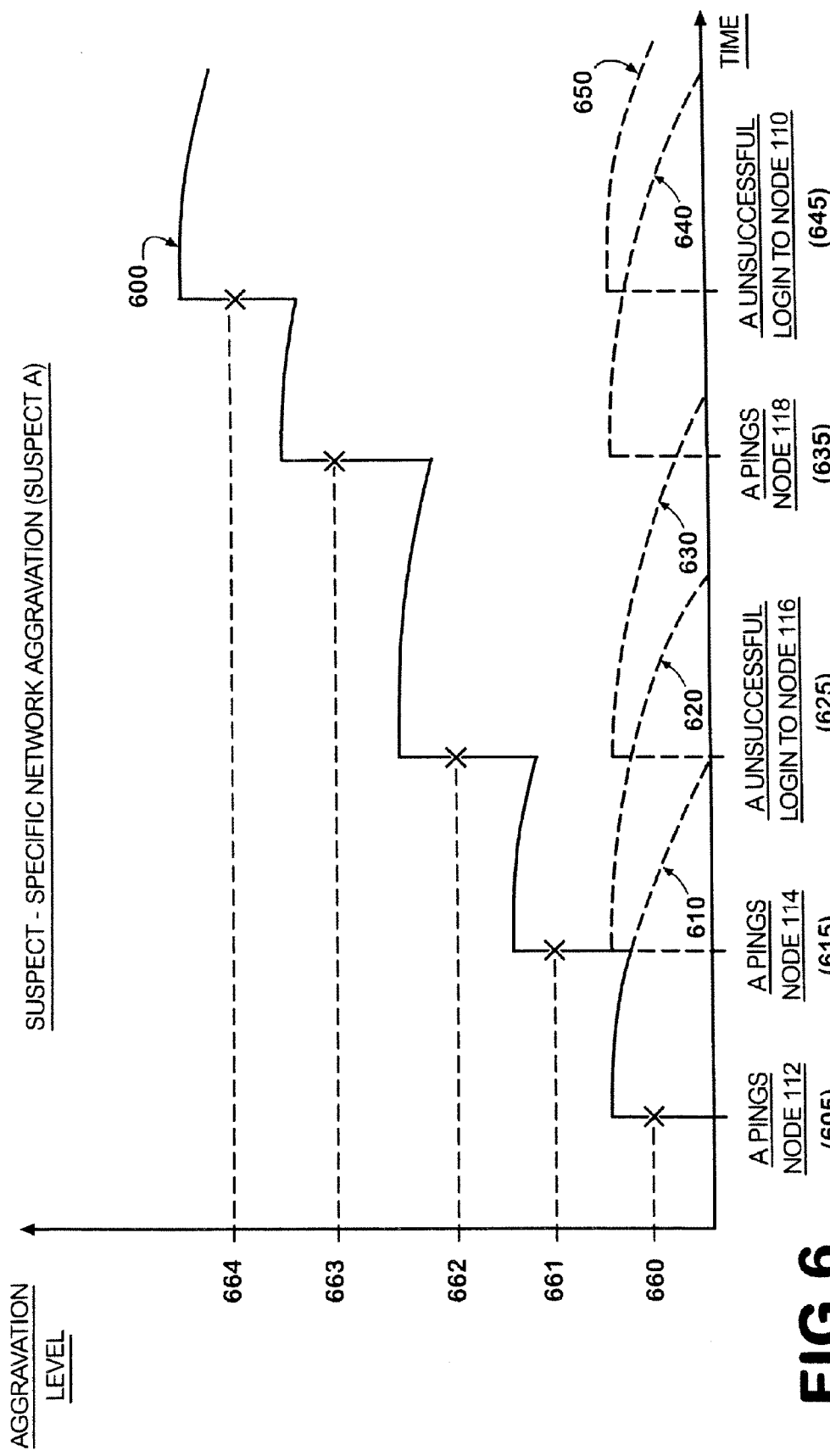
FIG. 6 is a graph illustrating the suspect-specific network aggravation response of another embodiment of the invention.

The graph in FIG. 6 illustrates how the suspect-specific network aggravation level (curve 600) may react to invalid logins and pings originating from suspect A and directed towards target nodes 110, 114, 116, and 118 on LAN 105. At 605, suspect A pings target 110. As a result, target 110's suspect-specific aggravation towards suspect A increases as shown in curve 610, which initially coincides with the suspect-specific network aggravation level towards suspect A (curve 600). Suspect A's ping causes the suspect-specific network aggravation level to cross threshold 660.

As previously described, threshold 660 may be set to trigger any number of responses from server 125 and/or target nodes 110, 114, 116, and 118. For example, at this threshold server 125 may begin passive scanning of all suspects over LAN 105 or network 130. In another embodiment, server 125 does not conduct any passive scanning of suspect A itself. Rather, when the suspect-specific network aggravation level for a particular suspect reaches a particular threshold which calls for passive scanning, server 125 notifies all target nodes on LAN 105 that they should individually increase their suspect-specific target aggravation towards suspect A.

At 615, suspect A pings target 114 and target 114's suspect-specific aggravation for suspect A increases as shown in curve 620. In response to this second ping by suspect A the suspect-specific network aggravation towards suspect A increases along curve 600 past a second threshold 661. Similarly, at 625, when suspect A unsuccessfully attempts to login to target 116, target 116's suspect-specific target aggravation increases (curve 630), and this incident contributes to the suspect-specific network aggravation towards suspect A. As suspect A continues to ping and/or produce login failures at 635 and 645, the suspect-specific network aggravation also increases as shown in curve 600.

Throughout this process, several additional thresholds 661-664 may be crossed. The same and/or different types of threshold responses described above with reference to the various target aggravation levels can also be implemented for the entire network. Thus, at threshold 661, one or more of the nodes on LAN 105 (e.g., server 125) may begin an active scan of suspect A to acquire additional information about suspect A on behalf of the entire network. At threshold 662, server 125 may begin a more extensive active scan and may also increase its passive scanning of suspect A. At threshold 663, server 125 may require suspect A to provide increased authentication to access any target node on LAN 105 (e.g., double logons). Finally, at the maximum threshold 664, server 125 may block all communication with suspect A over LAN 105. Server 125 may accomplish this either by communicating directly with gateway 120 and firewall 115, or by signaling all targets in LAN 105 to individually block communication with suspect A.

One important feature of the suspect-specific network aggravation response disclosed in FIG. 6 is that it increases based on all network-wide incidents originating from suspect A. Thus, while the suspect-specific target aggravations towards suspect A (curves 610, 620, 630, 640, and 650) individually remain low, the suspect-specific network aggravation response to each of these incidents has a cumulative effect and suspect A is properly identified as a suspicious node.

The suspect-specific network aggravation can be calculated in a variety of ways. In one embodiment, it is merely the sum of all suspect-specific target aggravation levels for suspect A. In another embodiment, it is the average of all suspect A suspect-specific target aggravation levels. In still another embodiment, the suspect-specific network aggravation is calculated independently of the individual suspect-specific target aggravation levels. This embodiment might be particularly useful on a LAN with a substantial number of target nodes.

For example, if 250 target nodes reside on LAN 105, suspect A may only make one attempt to gain unauthorized access to the first target and may then move on, making only one attempt at each of the remaining 249 targets. By the time suspect A is ready to make another attempt at the first target, the suspect-specific target aggravation level of the first target for suspect A might be too low to trigger a threshold due to the time lapse between login failures. However, if a central repository (e.g., server 125) on LAN 105 is following suspect A's activity across the entire network, then the suspect-specific network aggravation level for suspect A should be very high. In fact, if suspect A has attempted unsuccessfully to log in to all 250 targets, then the suspect-specific network aggravation level for suspect A should have surpassed its maximum threshold value, and all network communication with suspect A should be blocked as described above.

Just as each individual target may maintain an "overall target aggravation" which represents the target's aggravation in general, server 125 (or other node on LAN 125) may maintain an "overall network aggravation," which represents the network aggravation in general. Similarly, just as the overall target aggravation responds primarily to new incidents, the "overall network aggravation" in the present embodiment responds primarily to new network-wide incidents.

Thus, as suspect A in the preceding example moves from one target to the next across LAN 105, attempting to log in to each of the 250 individual target nodes, the overall network aggravation level will initially increase along with the suspect-specific network aggravation towards suspect A. However, as time passes and suspect A continues to cause login failures across LAN 105, the overall network aggravation may drop off. The logic here is similar to that for the overall target aggravation: when the network is aggravated by only a single suspect (or a few suspects) over an extended period of time, there is no need for the network to be suspicious of all suspects—only those causing the aggravation. Moreover, because the suspect-specific network aggravation towards suspect A in the preceding example will be beyond a maximum threshold, the network has taken steps to block communication with suspect A.

The overall network aggravation may be calculated by taking the average of all the overall target aggravation levels. Thus, in one embodiment, the node maintaining the overall network aggravation level (e.g., server 125) may query each of the targets on the network at predetermined time intervals. Alternatively, each target may automatically communicate its aggravation level to server 125 when its overall aggravation level passes through a threshold value. In another embodiment, the overall network aggravation is calculated independently of the overall target aggravations.

Throughout the preceding discussion, a specific implementation of network-level reactions at predetermined aggravation thresholds have been described. Depending on the particular configuration, however, different implementations could be employed without departing from the underlying principles of the present invention. For example, while the embodiment described above uses server 125 as the central network repository for calculating and storing network aggravation levels, any node on LAN 105 could provide the same functionality without departing from the scope of the present invention.

Moreover, different mathematical equations may be used to calculate the various threshold triggers. In one embodiment, threshold levels are calculated by combining multiple aggravation variables. For example the equation $A_I+0.75A_{target}+0.25A_{network}>T$ can be used to calculate the effective aggravation level using three parts of the overall target aggravation level, one part of the overall network aggravation level and adding this value to the aggravation level associated with the new incident arriving at the target.

Additionally, each incoming incident may increase each of the different aggravation levels described above based on an unlimited number of equations. For example, in one embodiment the equation $A=S*Count_{log}2$ will adjust the aggravation level "A" based on the severity of the incident type "S" and the current incident count "Count."

Throughout the preceding discussion, specific embodiments of the present system have been described as implemented on a network server (e.g., 125) and/or one or more network workstations (e.g., 110). Depending on the particular configuration, however, different implementations could be employed without departing from the underlying principles of the present invention. For example, the server and detection capability could be combined within a hub, switch, firewall (e.g., 115), gateway (e.g., 120), or a promiscuous mode capture device (e.g., node 118 with adapter in promiscuous mode). In this embodiment, the detection system can simultaneously track multiple targets according to the traffic it observes passing through the device, rather than just the one target it is implemented on. In this implementation, the network aggravation level is calculated from the targets monitored by the device.

Packet-Level Analysis and Filtration

Data transmission across LAN 105 by workstations 110 and server 125 for one embodiment of the present system will now be described with reference to FIG. 2A, which illustrates the different network protocol layers through which data is passed. When a workstation 110 or server 125 on LAN 105 transmits data to another workstation 125 or server 125 on LAN 105 or across network 130 to a node 140 on LAN 145, the data will pass through each of the transmission layers illustrated in FIG. 2A.

The first transmission layer illustrated in FIG. 2A is the physical layer 210. The physical layer 210 represents the actual medium through which the raw digital network traffic flows. For example, the workstations 110 and servers 125 on LAN 105 may be physically connected using numerous different types of media, including coaxial cable, twisted pair cable (e.g., "10 Base-T"), and fiber optic cable. Alternatively, the workstations and servers may be connected via a wireless transmission system (i.e., an RF or infrared transmission system). The layer directly above the physical layer 210 is referred to as the data link layer 220 (a.k.a. the "media access" layer). The data link layer 220 provides the protocol responsible for providing error-free transmission across the physical layer. It accomplishes this by incorporating the data to be transmitted (i.e. data received form the network layer 225) into data frames and then transmitting the frames sequentially across the physical layer 210. "Ethernet" and "Token Ring" are two well known examples data link protocols.

The network layer 225 resides directly above the data link layer 220 and provides network addressing (among other things) for the data to be transmitted. Data is incorporated into network "packets" at the network layer 225, with each packet containing a source and a destination address in its header. The "IP" portion of TCP/IP, also known as the Internet protocol, is one well known network-layer protocol.

Thus, when a workstation 110 or server 125 receives data which has been transmitted over LAN 105, it receives the data in data link layer frames, each frame containing one or more network layer packets. It then removes the network packets from the data link frames and transmits the packets up through the remaining protocol layers to the application layer 232 (where the application program resides which requested the data or from which data is being requested by another node).

Referring now to FIG. 2B, an analysis module 250 and a filter module 260 which comprise a portion of the intrusion detection and response system are illustrated. The analysis module 250 provides the aggravation level functionality of the present invention. It receives incoming network packets and determines the origin of the transmitted data and the type of data contained in the packet (e.g., ping, login request . . . etc). It then makes a decision as to how to deal with the incoming data based on the current aggravation levels of the target and the network.

For example, referring once again to FIG. 4, if the suspect-specific target aggravation level towards suspect A is above threshold 450 (after the analysis module 250 receives data packets comprising the latest incident from suspect A), then the analysis module 250 may initiate a passive scan of suspect A. If the new incident received from suspect A causes the analysis module to raise the suspect-specific target aggravation level towards suspect A above thresholds 451 or 452, the analysis module 250 may initiate an active scan of suspect A. If the suspect-specific target aggravation level for suspect A reaches threshold 545, the analysis module may require increased authentication from suspect A before providing suspect A access to the target's resources.

Finally, if the suspect-specific target aggravation towards suspect A is above a maximum threshold level, e.g., threshold 455, then analysis module 250 will apply filter module 260 to selectively filter out all data packets received from suspect A. While the foregoing discussion is focused on the suspect-specific target aggravation level, it should be noted that the analysis module 250 may also react to new incidents based on any of the other aggravation levels previously discussed (e.g., the overall target aggravation, the overall network aggravation, and the suspect-specific network aggravation).

It should be noted that the analysis 250 and filter 260 modules are inserted in the network protocol stack at the packet level (i.e., between the network and data link protocol layers). Thus, every data packet is analyzed before being passed through to the computer on which analysis module 250 and filter module 260 reside. As such, even "stealth" incidents (those designed to evade logging at the transport 230 and/or application 232 layers) are analyzed.

Throughout the preceding discussion, a specific embodiment of packet-level analysis has been described. Depending on the particular configuration, however, different implementations could be employed without departing from the underlying principles of the present invention. For example, while the embodiment described above analyzes network and transport layer connection incidents from packet information, it may instead choose to read the same information from the transport stack. Similarly, instead of recording login failure packets, the system may read those events from the application layer logging and auditing system. Thus, packet-level information can be reconstructed from other logging, auditing, and monitoring subsystems on the target without departing from the scope of the present invention.

Event-Time Rollup

Figure 8:
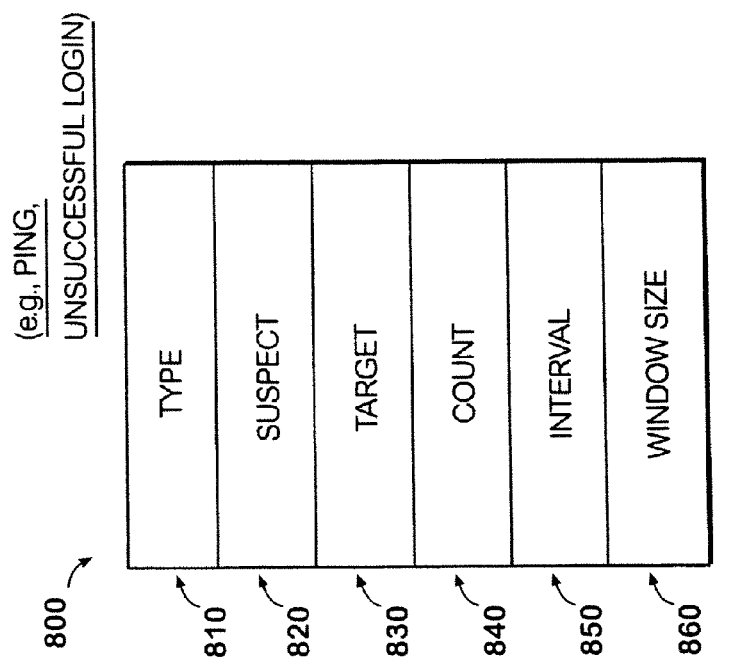
FIG. 8 is a graph illustrating an event data object according to one embodiment of the invention.
Figure 7:
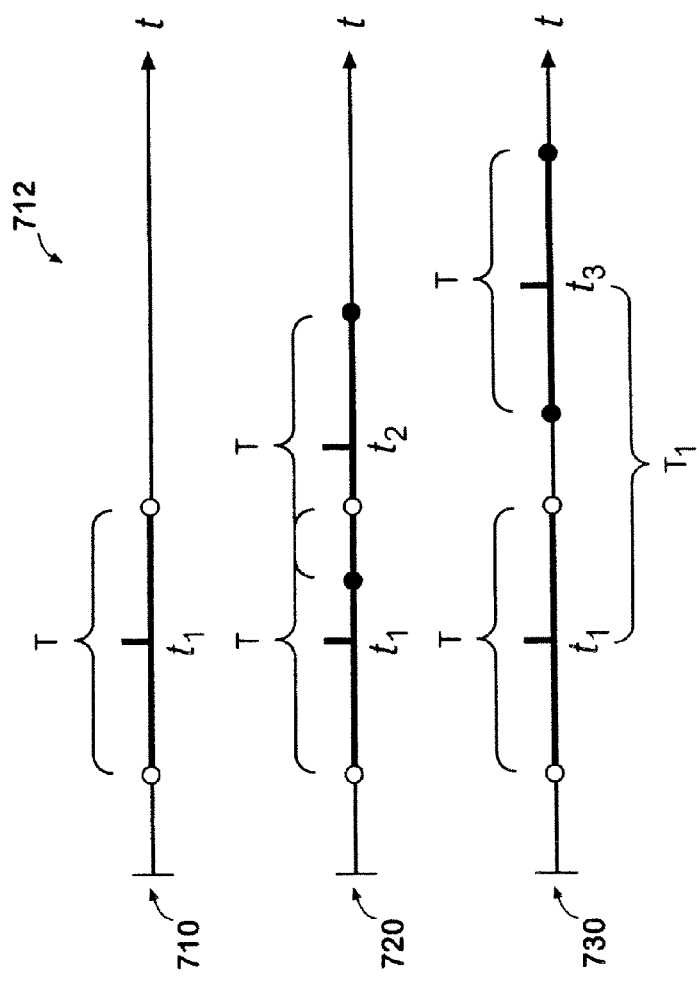
FIG. 7 is a graph illustrating the operation of event overlap according to one embodiment of the invention.

As used herein an "event" is a particular type of data communication (e.g., a ping) sent from a particular suspect to a particular target. An event data structure 800 is illustrated in FIG. 8. The event structure includes an event type field 810 (e.g., ping), a suspect identification field 820, a target identification field 830, a counter field 840, an interval field 850, and a window size field 860. When a target node or server begins passive scanning because one or more of the aggravation levels described above is beyond a predetermined threshold level, the target node or server may begin to log (e.g., store to hard disk) a record of all incoming events. In order to conserve memory, numerous events may be combined into a single event structure. This procedure, referred to herein as "event-time rollup" will now be described with respect to FIG. 7.

As shown in timeline 710, a window size 860 of time T initially surrounds each event. When the windows of two successive events overlap as shown in timeline 720, the two events are combined into a single event data object 700. Thus, after the second event arrives at $t_2$ in FIG. 720, the event data structure 800 will increase it's count data field from 1 to 2, indicating that there were two successive events which overlapped. This method of combining several events into a single data object is done to preserve memory and also to prevent a particular type of attack by a suspect wherein the suspect attempts to disable the target by filling up the target's hard drive will vast amounts of event data.

In addition, the event window of one embodiment may be dynamically expanded and contracted. For example, if events arrive slowly as shown in timeline 730, the event window can be expanded so that future events separated by the same time interval $T_1$ will be combined in the same data structure 800. For example, the new window may be expanded to twice time interval $T_1$. Thus, if the first and second events are separated by a 10-minute time interval and the default window T is 15 minutes, then the window will be expanded to 20 minutes. Moreover, if the event rate slowly decreases, then the window will continue to expand to keep up.

Another variable which may effect the event window size is one or more of the aggravation levels discussed above. Generally speaking, events which are classified as more serious (i.e., events that are more likely to be attacks by a suspect based on one or more aggravation levels) will cause the event window to expand. Thus, generally speaking, the default window size for a login failure event will be larger than the default window for a ping event.

In one embodiment, the only window which is considered when determining whether to include successive events in a single data object is the window associated with the current incoming event (e.g., the event at t2 at 720 and 730). In this embodiment, the only question is whether the previous event (e.g., occurring at t1 at 720 and 730) falls within the window of the new event. Accordingly, in this embodiment, the current window for the new event (i.e., at t2) will generally need to be larger to produce the same effect because the window surrounding t1 will no longer be a factor.

Difference Reports

Figure 9:
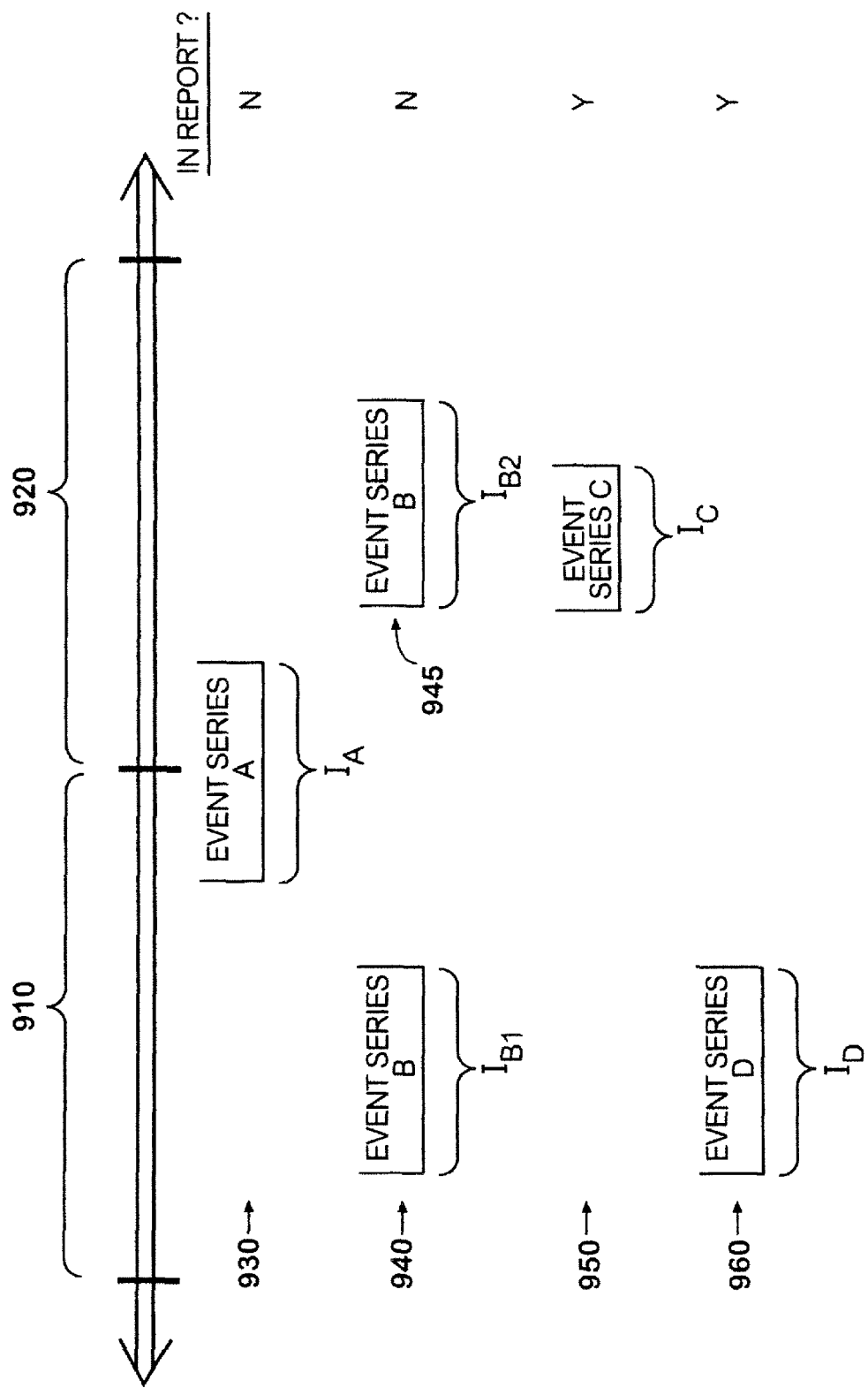
FIG. 9 illustrates two time periods which are used to calculate difference reports.

In addition, periodic reports may be generated which summarize all new events which occur during a predetermined time period. For example, FIG. 9 illustrates two periods of time, 910 and 920, during which a series of events, 930-960 occur. Period 910 represents a time period for which a report has already been generated. As indicated in FIG. 9, the first event series A 930 represents a series of two or more events separated by an interval $I_4$. The events included in event series A 930 are all events of the same type, suspect, and target. These events will not be included in the difference report generated at the end of the second time period 920 because event series A contains events which occur in both time periods.

Similarly, event series B 940, 945 will not be recorded because events of the same type, suspect and target occur in both time periods 910, 920. Thus, in one embodiment, the first step in creating a difference report is to determine whether the series of events in question overlap between the two time periods. If they do overlap, then they are not included in the difference report. If they don't overlap, then event data objects in the previous time period are searched to determine if one of the same type, suspect, and target was recorded. If such an event data object is found, then the events are not included in the difference report. Thus, the difference report produces the same result whether or not two events where combined (using the event rollup method) into a single longer-term event, or remained uncombined as two separate events.

By contrast, event C 950 occurs only during the second time period and will therefore show up on the difference report generated at the end of the second period 920. Event series D will not be included in the difference report generated after the second time period 920 because event series D does not occur during this time period. If a difference report is generated at all for event series D it will be generated at the end of the first time period 910.

The reason for recording only new events (i.e., of the same type, suspect and victim) is that it alleviates the problem of false positives (i.e., identifying an event as suspicious when it should not be identified as such). In other words, an event which occurs during every time period is not generally considered suspicious.

What is claimed is:

1. A computer program product for triggering responses based on computer data transmissions received at a computer network node, the computer program product comprising:
    a computer-readable, tangible storage device;
    first program instructions to determine type, destination, and origin of data contained in the computer data transmissions;
    second program instructions to modify variable for triggering responses based on the type, destination, and origin of the data contained in the computer data transmissions originating from one or more suspect computer nodes comprising workstations;
    third program instructions to trigger a first response in response to said modified variable equaling or exceeding a first predetermined threshold level; and
    fourth program instructions to trigger a second response in response to said modified variable equaling or exceeding a second predetermined threshold level,
    wherein the first, second, third, and fourth program instructions are stored on the computer-readable, tangible storage device.

2. The computer program product of claim 1, further comprising fifth program instructions to trigger additional responses in response to said modified variable equaling or exceeding one or more additional threshold levels, and wherein the fifth program instructions are stored on the computer-readable, tangible storage device.

3. The computer program product of claim 1, wherein one of said triggered responses comprises a passive scan of one or more of said suspect computer nodes.

4. The computer program product of claim 3, wherein said passive scan includes recording said computer data transmissions in a log file.

5. The computer program product of claim 1, wherein one of said triggered responses comprises an active scan of one or more of said suspect computer nodes.

6. The computer program product of claim 5, wherein said active scan comprises retrieving information about said one or more of said suspect computer nodes including the network address of said one or more of said suspect computer nodes.

7. The computer program product of claim 5, wherein said active scan comprises determining the network route taken by data originating from said one or more of said suspect computer nodes.

8. The computer program product of claim 1, wherein one of said triggered responses comprises said computer network node requiring increased authentication from any other computer network node before providing access to said computer network node's resources.

9. The computer program product of claim 8, wherein said increased authentication comprises said computer network node forcing two or more logins before providing access to said computer network node's resources.

10. The computer program product of claim 1, wherein one of said triggered responses comprises blocking incoming computer data transmissions.

11. The computer program product of claim 1, wherein said modified variable responds differently over time to particular types of computer data transmissions.

12. The computer program product of claim 11, wherein said modified variable continuously increases in response to the continuous receipt of a particular type of computer data transmission until the modified variable reaches a predetermined value.

13. The computer program product of claim 12, wherein said particular type of computer data transmission comprises an invalid login attempt.

14. The computer program product of claim 11, wherein said modified variable initially increases in response to the continuous receipt of a particular type of computer data transmission and subsequently decreases in response to the continued receipt of said particular type of computer data transmission.

15. The computer program product of claim 14, wherein said particular type of computer data transmission comprises a computer data transmission which retrieves information about said suspect computer network node.

16. The computer program product of claim 1, wherein the type, destination, and origin of data of said computer data transmissions are determined on a network packet level.

17. The computer program product of claim 16, wherein said computer data transmissions are filtered by said computer network node on a network packet level.

18. The computer program product of claim 1, wherein the second program instructions to modify the variable comprises:
fifth program instructions to determine whether the type, destination, and origin of the data matches a type, destination, and origin of previously received data originating from the one or more suspect computer nodes; and
sixth program instructions to increase the variable in response to the type, destination, and origin of the data matching the type, destination, and origin of the previously received data,
wherein the fifth and sixth program instructions are stored on the computer-readable, tangible storage device.

19. The computer program product of claim 1, further comprising fifth program instructions for setting the variable at a default level prior to the variable being modified, wherein the fifth program instructions are stored on the computer-readable, tangible storage device.

20. A computer program product for triggering a response based on computer data transmissions comprising non-voice based data received at a computer network node, the computer program product comprising:
a computer-readable, tangible storage device;
first program instructions to determine type and origin of data contained in the computer data transmissions;
second program instructions to modify a first variable for triggering one or more responses based on the type and origin of the data contained in computer data transmissions originating from a first suspect computer node comprising a first workstation;
third program instructions to modify a second variable for triggering one or more responses based on the type and origin of the data contained in computer data transmissions originating from a second suspect computer node comprising a second workstation different than the first workstation; and
fourth program instructions to trigger a response in response to either of said modified first or second variables equaling or exceeding a predetermined threshold level,
wherein the first, second, third, and fourth program instructions are stored on the computer-readable, tangible storage device.

21. The computer program product of claim 20, further comprising fifth program instructions to trigger additional responses in response to either of said modified first or second variables equaling or exceeding additional predetermined threshold values, and wherein the fifth program instructions are stored on the computer-readable storage device.

22. The computer program product of claim 20, further comprising fifth program instructions to modify third variable for triggering a response to each one of said first and second suspect computer nodes based on said computer data transmissions originating from each of said first and second suspect computer nodes, and wherein the fifth program instructions are stored on the computer-readable storage device.

23. The computer program product of claim 22, further comprising sixth program instructions to trigger a response towards each one of said first and second suspect computer nodes in response to said modified third variable equaling or exceeding another predetermined threshold value, and wherein the sixth program instructions are stored on the computer-readable storage device.

24. The computer program product of claim 22, wherein said modified third variable is more responsive to new types of computer data transmissions than to computer data transmissions previously received at said computer network node.

25. The computer program product of claim 24, further comprising seventh program instructions to initially increase said modified third variable in response to the computer data transmissions originating from a particular suspect computer node and subsequently decrease said modified third variable upon continued receipt of said computer data transmissions from said particular suspect computer node, and wherein the seventh program instructions are stored on the computer-readable storage device.

26. The computer program product of claim 20, further comprising fifth program instructions to communicate each of said modified first and second variables to a network database residing on a computer server node, and wherein the fifth program instructions are stored on the computer-readable storage device.

27. The computer program product of claim 22, further comprising sixth program instructions to communicate said modified third variable to a network database residing on a computer server node, and wherein the sixth program instructions are stored on the computer-readable storage device.

28. The computer program product of claim 1, wherein the second program instructions to modify the first variable comprises:
    fifth program instructions to determine whether the type and origin of the data contained in the computer data transmissions originating from the first suspect computer node matches a type and origin of previously received data originating from the first suspect computer node; and
    sixth program instructions to increase the first variable in response to the type and origin of the data matching the type and origin of the previously received data,
    wherein the fifth and sixth program instructions are stored on the computer-readable, tangible storage device.

29. The computer program product of claim 20, wherein the third program instructions to modify the second variable comprises:
    fifth program instructions to determine whether the type and origin of the data contained in the computer data transmissions originating from the second suspect computer node matches a type and origin of previously received data originating from the second suspect computer node; and
    sixth program instructions to increase the second variable in response to the type and origin of the data matching the type and origin of the previously received data,
    wherein the fifth and sixth program instructions are stored on the computer-readable, tangible storage device.

30. The computer program product of claim 20, further comprising fifth program instructions for setting the first variable and the second variable at a default level prior to the first and second variables being modified, wherein the fifth program instructions are stored on the computer-readable storage device.

31. A computer system for triggering a network response, the computer system comprising:
    a CPU, a computer-readable memory, and a computer-readable, tangible storage device;
    first program instructions to store a plurality of first variables for a plurality of computer network nodes comprising workstations;
    second program instructions to modify a second variable based on the value of each of said plurality of first variables; and
    third program instructions to trigger a network response said second variable equaling or exceeding a predetermined threshold level, wherein the network response comprises notifying each of the plurality of computer network nodes that they should each increase their suspect-specific alert variable towards a particular suspect computer network node and initiating an active scan of the particular suspect computer network node,
    wherein the first, second, and third program instructions are stored on the computer-readable, tangible storage device for execution by the CPU via the computer-readable memory.

32. The computer system of claim 31, wherein said network response includes the act of initiating a passive scan of the particular suspect computer network node.

33. The computer system of claim 31, wherein said network response includes the act of blocking all communication between said suspect computer network node and said plurality of computer network nodes.

34. The computer system of claim 31, wherein the second program instructions to modify the second variable comprises:
    fourth program instructions to increase the second variable in response to one or more of the plurality of first variables increasing; and
    fifth program instructions to decrease the second variable in response to one or more of the plurality of first variable decreasing,
    wherein the fourth and fifth program instructions are stored on the computer-readable, tangible storage device.

35. The computer program system of claim 31, further comprising fourth program instructions for setting the second variable at a default level prior to the second variable being modified, wherein the fourth program instructions are stored on the computer-readable, tangible storage device.

* * * * *